United States Patent Office 3,074,804
Patented Jan. 22, 1963

3,074,804
INTERGRANULAR BARRIER LAYER DIELECTRIC CERAMIC COMPOSITIONS AND THE METHOD OF PRODUCTION THEREOF
George Victor Planer, Richmond, and Raymond Malcolm Glaister, Shepperton, England, assignors to National Research Development Corporation, London, England, a British corporation
No Drawing. Filed Nov. 28, 1958, Ser. No. 776,744
Claims priority, application Great Britain Nov. 29, 1957
12 Claims. (Cl. 106—39)

The present invention relates to barrier layer ceramic dielectric materials and to methods of production of these materials.

Existing types of ceramic dielectrics may be made which have a dielectric constant in excess of 100,000 or higher but which have high power factors.

It is an object of the present invention to provide barrier layer ceramic dielectric material having a dielectric constant which is still high, say, of the order of 50,000 or more and which has a relatively low power factor.

A barrier layer ceramic dielectric material is one which is made up of granules of dielectric material which form part of a sintered mass. The granules are themselves conducting and have a specific resistance of the order of 10 ohms/cm. to 100 ohms/cm. In between the granules there is formed a very thin non-conductive layer. This construction of the ceramic dielectric material enables the effective dielectric constant of the whole mass to be much greater than the dielectric constant of the constituent materials.

According to the present invention, a barier layer ceramic dielectric material is provided which is non-ferroelectric at normal working temperatures and has a perovskite type structure. Such material may take the form of compositions of alkaline earth titanates, or of alkaline earth titanates with alkaline earth zirconates, alkaline earth stannates, tantalum oxide or bismuth oxide and titanium dioxide. The effective dielectric constant of such a dielectric should be above 50,000 (preferably more than 300,000), and tan $d$ should be less than 0.05, where $d$ is the loss angle, at normal working temperatures.

For the purposes of the specification and the appended claims, the expression "normal working temperatures" is used to signify temperatures at which capacitors incorporating dielectric materials are normally used.

According to another aspect of the invention, barrier layer ceramic dielectric materials are manufactured by making a composition having a perovskite type structure and having non-ferroelectric properties at normal working temperatures, making the composition into a compact form, sintering and reducing the composition so as to render the composition conductive and then oxidizing the composition to form the required barrier layers.

The composition may be made by forming mixtures or solid solutions of alkaline earth titanates or of alkaline earth titanates with other materials such as alkaline earth zirconates, alkaline earth stannates or tantalum oxide which have the effect of producing a fairly low temperature Curie point. The Curie point is so chosen that the solid solution or mixture is non-ferroelectric at normal working temperatures and yet, preferably, the dielectric constant of the solid solution or mixture is still as high as possible.

Alternatively, the composition may comprise strontium titanate, bismuth oxide and titanium dioxide and may be of the form $SrTiO_3.m(Bi_2O_3.nTiO_2)$ where $m$ lies between 5 and 16 molar percent and $n$ lies between 1 and 5.

In the process of manufacturing ceramic capacitors it has been found that by using a barrier layer type ceramic material manufactured under carefully controlled conditions by the methods hereinafter described, low working voltage capacitors can be produced having certain desirable features, namely large capacity for small size due to the high dielectric constant of the ceramic dielectric, a reasonably low power factor and a relatively wide working temperature range.

A further desirable feature of barrier layer type dielectrics produced by the methods herein described is the relatively low variation in the dielectric constant and the power factor with temperature in the working temperature range of the dielectric.

In one method of manufacturing a barrier layer ceramic dielectric, a composition comprising solid solutions or mixtures of alkaline earth titanates or of alkaline earth titanates with other materials such as alkaline earth zirconates or stannates or tantalum oxide with or without added ceramic flux was milled in a ball mill and subsequently was made into compact forms such as discs, plates or tubes (these can be of the order of 0.25 mm. thick or more), in a die press and these ceramic forms were placed in molybdenum boats or on molybdenum sheet and sintered by firing at a temperature of the order of 1300° C. to 1400° C. for a period of the order of one hour or more in air or an oxygen atmosphere to form a ceramic. The sintering process must leave the ceramic sufficiently porous to allow diffusion of the atmosphere into the form during the subsequent oxidation process.

The forms were then fired in a reducing atmosphere such as hydrogen at a temperature between 1300° C. and 1400° C. preferably for over an hour to render the ceramic composition conductive. After this reduction process electrodes were deposited on the ceramic which was then fired in an oxygen atmosphere or air for a period usually in excess of one hour at a temperature between 600° and 900° C. (preferably of the order of 700° C.) to form barrier layers. This temperature may be varied over quite large limits for differing periods varying from one hour to about five hours. The temperature, firing time and the gas pressure are mutually interdependent and suitable oxidation or the requisite thickness of barrier layer, depends on the oxygen diffusion rates into the ceramic. The density of the ceramic also affects the diffusion rates.

The constituents of the solid solutions or mixtures and the ratio of the constituents are so chosen that the Curie points of the ceramic, prior to the reduction process, are sufficiently far below room temperature for the dielectric loss at this stage of the process to be very low. The starting composition, that is the solid solution or mixture, is so composed that the operating temperature range of the dielectric in its final form, for example, the dielectric in a capacitor, falls within the essentially non-ferroelectric region of the dielectric. The low dielectric loss factor of the unreduced solid solution or mixture has been found to be important although the dielectric constant of the unreduced solid solution or mixture may be low.

Solid solutions or mixtures found to be suitable are, for example, made from the components barium titanate and strontium titanate in the molecular ratio 65:35 or 60:40 which have Curie points of —16° C. and —30° C. respectively.

The solid solution or mixture may be made, for example in the case of the barium-strontium titanate dielectric, in the following manner. The constituent substances barium carbonate, strontium carbonate and titanium dioxide are milled together and fired in air for two hours at 1250° C. Another suitable starting composition for producing a dielectric with suitable qualities is a solid solution or mixture of the components barium titanate with barium stannate which is made by milling together the following constituents barium carbonate, stannic oxide and titanium dioxide and then firing. A further suitable starting composition is a solid solution or mixture of the components barium titanate with calcium zirconate, which may be prepared by milling together the constituents barium carbonate, calcium oxide, zirconium dioxide and titanium dioxide and then firing. In all the above procedures, the starting composition formed by milling and firing is subsequently crushed and formed into powder in a ball mill. In the above-mentioned solid solutions or mixtures the initial constituent materials must be mixed in the requisite chemical proportions to form substantially stoichiometric compounds.

The components of the above solid solutions or mixtures are chosen to be present in such ratios as will produce a very low dielectric loss factor for example tan $d$ being often below .001, where $d$ is the loss angle.

Examples of suitable solid solutions or mixtures which provide the required electrical properties of high dielectric constant and low power factor are as follows:

One example is a solid solution of 82.5 molecular percent of barium titanate with 17.5 molecular percent of calcium stannate which may be formed by mixing 41.25 molecular percent of barium carbonate, 8.75 molecular percent of calcium carbonate, 41.25 molecular percent of titanium dioxide and 8.75 molecular percent of tin dioxide together in a ball mill and firing at 1250° C. for two hours.

A second example is a solid solution of 62.5 molecular percent of barium titanate and 37.5 molecular percent of strontium titanate which may be formed by mixing 31.25 molecular percent of barium carbonate, 18.75 molecular percent of strontium carbonate and 50 molecular percent of titanium dioxide together in a ball mill and firing at 1250° C. for two hours. This composition has a Curie point at −20° C.

A further example is a solid solution of barium and strontium titanates with tantalum oxide which may be formed by mixing 34.65 molecular percent of barium carbonate, 14.85 molecular percent of strontium carbonate, 49.5 molecular percent of titanium dioxide and 1.00 molecular percent of $Ta_2O_5$ together in a ball mill and firing at 1250° C. for two hours. This composition has a Curie point of −10° C.

It is believed that during the final oxidation process the granules of the component materials which may be of the order of 1 micron diameter become surrounded by extremely thin barrier layers for example of the order of 100 Angstrom units forming a barrier layer dielectric. This barrier layer dielectric is a non-homogeneous, but normally isotropic, dielectric in which the bulk of the material is electrically conductive but is in the form of electrically conducting granules mutually isolated by thin films or barriers of insulating material.

The deposition of electrodes on the ceramics is preferably carried out between the reducing and the subsequent oxidizing processes, preferably by cathode sputtering or vaporizing platinum or other noble metal on opposite surfaces of the plates or discs, since an intimately adhering electrode is required. Metallising paints which are subsequently stoved are preferably not used as they may alter the state of oxidation of the material of which the dielectric is made, and also the subsequent oxidation process may cause deterioration of the electrode. Metallising paint for forming electrodes may, however, be applied towards the end of the oxidising process. In this case, the final oxidisation of the ceramic and the stoving of the metallising paint is done simultaneously. The sputtered or vaporized electrodes can subsequently be reinforced by known means to allow the soldering of electrical leads to be applied.

A ceramic dielectric disc produced by the method hereinbefore described and of the barium titanate-strontium titanate type had a value of dielectric constant 300,000 and a power factor tan $d = .025$. Also the variation of dielectric constant between 20° C. and 130° C. was of the order of 13% and the variation of tan $d$ over the same temperature range was of the order of 32%.

Another method of forming a barrier layer ceramic dielectic which has been employed in carrying out the invention consisted of mixing 65 grams of strontium titanate, 26.1 grams of bismuth oxide and 8.9 grams of titanium dioxide with distilled water in a ball mill for four hours. The resulting slurry was pressed into a compact mass of circular section two inches in diameter and pre-fired for two hours at a temperature of 1250° C. to form a solid solution. The resultant mass was then crushed in a mortar and ball-milled with distilled water for four hours to produce a fine powder. To ensure homogeneity of the resulting product, the powder was again mixed with distilled water, pressed into a compact mass as before and pre-fired for two hours at a temperature of 1250° C. The mass was then crushed in a mortar and ball-milled with distilled water for four hours to produce a final powder. This second firing was found not to be absolutely necessary and was omitted on many occasions when the method was carried out.

The powdered composition from the ball-milling process was dried and pressed or extruded into discs, tubes or other compact forms with the addition, if necessary, of a little distilled water and/or binding agent. These forms were then fired at a temperature between 1200° C. and 1350° C. (preferably between 1300° C. and 1350° C.) for about one hour in air in order to sinter the material. The forms were then reduced by firing at a temperature between 1200° C. and 1350° C. (preferably at a temperature of 1300° C.) in hydrogen or other reducing atmosphere for about one hour. Electrodes were then deposited on the forms, for example by a silver paste process or by sputtering, on appropriate surfaces to form capacitors. The forms were then re-oxidised in an oxidising atmosphere, such as air or oxygen, at a temperature between 500° C. to 900° C. (preferably at 600° C.) until tan $d$ (where $d$ is the loss angle), measured at a temperature of 20° C. by applying a voltage of 10 volts per centimeter thickness of dielectric at 1000 cycles per second, fell to 0.06 or less. A typical time for re-oxidation for the required value of loss angle to be reached at 600° C. was found to be four hours. It was found that the deposition of electrodes may be carried out after instead of before the re-oxidation process.

In a modified form of this process, the discs, tubes or other forms formed from the powder produced in the last ball-milling stage of the process was not sintered in air but were sintered at the same time as being reduced. For this purpose, the firing in a reducing atmosphere was carried out at a temperature between 1200° C. and 1350° C. for about one hour.

Dielectric material produced from a composition containing the above-described proportions of strontium titanate, bismuth oxide and titanium dioxide have been found to have dielectric constants of the order of $10^5$ and variations of dielectric constant over the temperature range −40° C. to 125° C. have been found to be of the order of not more than 3% compared with the dielectric constant at a temperature of 20°.

The proportions of strontium titanate, bismuth oxide and titanium dioxide in a dielectric composition formed by the last-described method may be varied within wide limits. The general formula for the composition may be written as $SrTiO_3.m(Bi_2O_3.nTiO_2)$. Although some bismuth titanate may be formed as well, this possibility will be neglected for the purposes of this specification and the appended claims. It has been found that $n$ may lie between 1 and 5 and $m$ may lie between 5 and 16 molecular percent of the composition. Preferably $m$ lies between 6 and 16 molecular percent where $n$ is 2 and $m$ lies between 5 and 15 molecular percent where $n$ is 3. However, $n$ need not be a whole number.

An example of a composition of the form $$SrTiO_3.m(Bi_2O_3.nTiO_2)$$

where $m$ and $n$ fall within the above-described limits, is one containing 63.7 molecular percent of strontium titanate, 9.1 molecular percent of bismuth oxide and 27.2 molecular percent of titanium dioxide. A similar composition may be made by mixing together 38.9 molecular percent of strontium carbonate, 55.55 molecular percent of titanium dioxide and 5.55 molecular percent of bismuth oxide and firing at a temperature between 1200° C. and 1250° C. followed by the requisite crushing and milling to a finely powdered composition.

It has been found that up to 70 molecular percent of the strontium titanate in the composition of the form $SrTiO_3.m(Bi_2O_3.nTiO_2)$, where $m$ and $n$ fall within the above-described limits, may be replaced by barium titanate and up to 50 molecular percent of the strontium titanate may be replaced by calcium titanate or both barium titanate and calcium titanate. For example, a suitable composition may be made by mixing 32.3 molecular percent of strontium carbonate, 8.1 molecular percent of calcium carbonate, 6.4 molecular percent of bismuth oxide and 53.2 molecular percent of titanium dioxide together and firing at a temperature between 1200° C. and 1250° C., followed by the requisite crushing and milling to a finely powdered composition.

The subsequent process for producing a barrier layer ceramic dielectric from the powdered composition is essentially the same in these examples as in the last-described method. However, the firing temperature necessary for sintering has been found to decrease as the molecular percentage of $Bi_2O_3.nTiO_2$ in the composition increased.

We claim:

1. An intergranular barrier layer ceramic dielectric material comprising conductive granules of a composition having a perovskite type structure which is non-ferroelectric at normal capacitor working temperatures, of a mixture of at least two substances selected from the group consisting of (a) alkaline earth titanates, (b) alkaline earth zirconates, (c) alkaline earth stannates, (d) tantalum oxide and (e) a mixture of bismuth oxide and titanium dioxide, at least one of said substances being an alkaline earth titanate, substantially each of said granules being surrounded by a non-conductive barrier layer of an oxidized form of said composition, said ceramic dielectric material having an effective dielectric constant above 50,000 and tan $d$ at most 0.06.

2. An intergranular barrier layer ceramic dielectric material as set forth in claim 1 in which the composition consists of barium titanate and strontium titanate in molecular ratios substantially lying between 60:40 and 65:35.

3. An intergranular barrier layer ceramic dielectric material as claimed in claim 2 wherein the said composition comprises a reduced solid solution of barium titanate and strontium titanate in the molecular ratio 65 to 35.

4. An intergranular barrier layer ceramic dielectric material as claimed in claim 2 wherein the said composition comprises a solid solution of barium titanate and strontium titanate in the molecular ratio 60 to 40.

5. An intergranular barrier layer ceramic dielectric material as claimed in claim 1 wherein the said composition comprises a solid solution of 82.5 molecular percent of barium titanate with 17.5 molecular percent of calcium stannate.

6. An intergranular barrier layer ceramic dielectric material as set forth in claim 1 in which said composition consists of strontium titanate, bismuth oxide and titanium dioxide.

7. An intergranular barrier layer ceramic dielectric material as claimed in claim 6 and wherein the composition is of the form $SrTiO_3m(Bi_2O_3.nTiO_2)$ where $m$ lies between 5 and 16 molecular percent and $n$ lies between 1 and 5.

8. An intergranular barrier layer ceramic dielectric material as claimed in claim 7 and wherein $n$ is 2 and $m$ lies between 6 and 16 molecular percent.

9. An intergranular barrier layer ceramic dielectric material as claimed in claim 7 wherein up to 50 molecular percent of the strontium titanate is replaced by at least one of the alkaline earth titanates selected from the group consisting of calcium titanate and barium titanate.

10. An intergranular barrier layer ceramic dielectric material as claimed in claim 7 and where up to 70 molecular percent of the strontium titanate is replaced by barium titanate.

11. An intergranular barrier layer ceramic dielectric material as claimed in claim 6 wherein the composition consists of 63.7 molecular percent of strontium titanate, 9.1 molecular percent of bismuth oxide and 27.2 molecular percent of titanium dioxide.

12. An intergranular barrier layer ceramic dielectric material as claimed in claim 7 and wherein $n$ is 3 and $m$ lies between 5 and 15 molecular percent.

References Cited in the file of this patent

UNITED STATES PATENTS

| | | |
|---|---|---|
| 2,520,376 | Roup et al. | Aug. 29, 1950 |
| 2,529,719 | Wentworth | Nov. 14, 1950 |
| 2,563,307 | Burnham et al. | Aug. 7, 1951 |
| 2,633,543 | Howatt | Mar. 31, 1953 |
| 2,821,490 | Dunegan | Jan. 28, 1958 |
| 2,841,508 | Roup et al. | July 1, 1958 |